United States Patent
Forstner

(10) Patent No.: US 7,576,687 B2
(45) Date of Patent: Aug. 18, 2009

(54) RF FRONT-END CIRCUITRY WITH REDUCED DC OFFSET

(75) Inventor: Johann Peter Forstner, Steinhoering (DE)

(73) Assignee: Infineon Technologies AG, Neubiberg (DE)

( * ) Notice: Subject to any disclaimer, the term of this patent is extended or adjusted under 35 U.S.C. 154(b) by 117 days.

(21) Appl. No.: 11/778,827

(22) Filed: Jul. 17, 2007

(65) Prior Publication Data

US 2009/0023405 A1 Jan. 22, 2009

(51) Int. Cl.
*G01S 13/00* (2006.01)
*H03B 1/04* (2006.01)

(52) U.S. Cl. .................. 342/175; 342/21; 331/105
(58) Field of Classification Search .............. 342/21, 342/175; 331/105
See application file for complete search history.

(56) References Cited

U.S. PATENT DOCUMENTS

| | | | |
|---|---|---|---|
| 3,905,034 A * | 9/1975 | Jensen et al. ............. 342/110 |
| 4,891,649 A * | 1/1990 | Labaar et al. ............. 342/203 |
| 5,872,537 A | 2/1999 | Siweris |
| 6,094,158 A * | 7/2000 | Williams ................. 342/70 |
| 6,133,795 A * | 10/2000 | Williams ................. 331/9 |
| 6,215,367 B1 * | 4/2001 | Blaud et al. ............. 331/105 |
| 6,639,478 B2 * | 10/2003 | Gomez ................. 331/116 FE |
| 7,469,128 B2 * | 12/2008 | Pasternak et al. .......... 455/86 |
| 2002/0093384 A1 | 7/2002 | Woods et al. |
| 2004/0123667 A1 | 7/2004 | McGrath |
| 2008/0278370 A1 * | 11/2008 | Lachner et al. ........... 342/200 |

* cited by examiner

*Primary Examiner*—Thomas H Tarcza
*Assistant Examiner*—Peter M Bythrow
(74) *Attorney, Agent, or Firm*—Slater & Matsil, L.L.P.

(57) ABSTRACT

An RF front-end circuit includes a directional coupler, a mixer, and a reflection circuit. The directional coupler is adapted to receive an antenna signal and an oscillator signal. The mixer is coupled to the directional coupler to receive the antenna signal and is further adapted to receive a mixer signal and to generate an output signal related to the antenna signal and the mixer signal. The reflection circuit is coupled to the directional coupler to receive the oscillator signal and is adapted to reflect at least a portion of the oscillator signal to the mixer via the directional coupler to counteract a parasitic portion of the oscillator signal received at the mixer.

24 Claims, 4 Drawing Sheets

RF FRONT-END CIRCUITRY WITH REDUCED DC OFFSET

TECHNICAL FIELD

The invention relates to a radio frequency circuit for transmitting and receiving RF signals (RF front-end) and to a monostatic radar system comprising such an RF front-end.

BACKGROUND

Known radar systems that are currently used for distance measurement in vehicles essentially comprise two separate radar subsystems which operate in different frequency bands. For distance measurements in a short range (short range radar), radar systems currently used are typically those which operate in a frequency band around a mid-frequency of 24 GHz. Short range typically means distances from 0 to about 20 meters from the vehicle. The frequency band from 76 GHz to 77 GHz is currently used for distance measurements in the long range, that is for measurements in the range from about 20 meters to around 200 meters (long range radar). These different frequencies are an impediment to the creation of a single concept for a radar system which can carry out measurements in a plurality of range zones, and in principle result in the need for two separate radar systems.

The frequency band from 77 GHz to 81 GHz is likewise suitable for short range radar applications, and has also been made available by the authorities for this purpose, so that a frequency range from 76 GHz to 81 GHz is now available for automobile radar applications in the short range and in the long range. A single multirange radar system which carries out distance measurements in the short and in the long range using a single radio-frequency transmission/reception module (RF front-end) has, however, not yet been feasible for various reasons. One reason is that circuits which are manufactured using III/V semiconductor technologies (for example gallium-arsenide technologies) are used at the moment to construct known radar systems. Gallium-arsenide (GaAs) technologies are highly suitable for the integration of radio-frequency components, but it is generally not possible to achieve a degree of integration which is as high, for example, as that which would be possible with silicon integration because of technological restrictions. Furthermore, only a portion of the required electronics are manufactured using GaAs technology, so that a large number of different components are required to construct the overall system.

RF oscillators which are manufactured using SiGe-technology for RF front-ends (i.e., RF circuits for transmitting and receiving RF signals) and which can be tuned throughout the entire frequency range from 76 GHz to 81 GHz have, however, become possible only as a result of the latest manufacturing technologies, that allow for the production of radar systems which are substantially more compact and more cost effective compared to known radar systems. Beside a compact architecture, a large "field of view" of the radar sensor is desired when designing RF front-ends of radar systems, wherein the transmitted signal power increases with an increasing field of view.

Monostatic radar systems which have common antennas for transmitting and receiving signals are often used due to their compact architecture. The RF front end of monostatic radar systems typically comprises a directional coupler (e.g., a rat race coupler) for separating the signals to be transmitted from the received signals. A received signal is down-mixed into a baseband or an intermediate frequency band (IF-band) by a mixer which is connected to the directional coupler. The baseband signal or the intermediate frequency signal (IF-signal) being provided at the output of the mixer may be digitized for further digital signal processing.

A real directional coupler, which may be realized using microstrip lines, does not achieve ideal properties with respect to through-loss and isolation, which ideally is zero or infinity, dependent on the pair of ports of the directional coupler. The oscillator signal which is supplied to an input-port of the directional coupler for being transmitted is not only coupled to the port which is connected to the antenna, but a small part of the oscillator signal (which means a fraction of the power of the oscillator signal) is also coupled to the port which is connected to a signal input of the mixer. This part of the oscillator signal is superimposed with the signal received by the antenna at the mixer input. This superimposition results in a DC signal offset at the output of the mixer which is superimposed with the baseband-signal or the IF-signal respectively. Especially when using active mixers this DC signal-offset can be very disturbing. The DC signal offset increases with an increasing transmitting power. Consequently, the DC signal-offset is a parameter limiting the power of the signal to be transmitted and therefore limiting the field of view of the radar sensor.

This effect is not limited to radar applications, but can also occur in general communication applications. There is a general need to provide an RF front-end with a directional coupler and a mixer, wherein the DC signal-offset at the mixer output is substantially eliminated.

SUMMARY OF THE INVENTION

Embodiments of the invention relate to radar systems and methods and to RF front-end circuitry. One embodiment of an RF front-end circuit comprises a directional coupler, a mixer, and a reflection circuit. The directional coupler is adapted to receive an antenna signal and an oscillator signal. The mixer is coupled to the directional coupler to receive the antenna signal and is further adapted to receive a mixer signal and to generate an output signal related to the antenna signal and the mixer signal. The reflection circuit is coupled to the directional coupler to receive the oscillator signal and is adapted to reflect at least a portion of the oscillator signal to the mixer via the directional coupler to counteract a parasitic portion of the oscillator signal received at the mixer.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
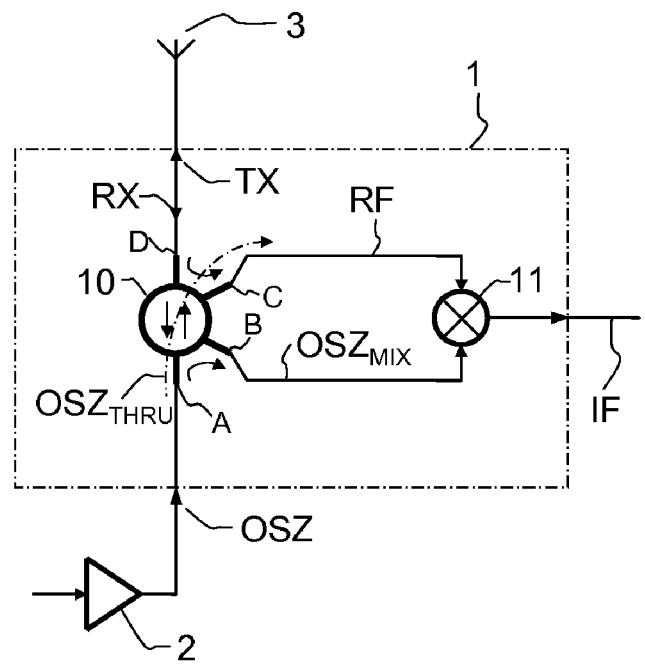
FIG. 1 illustrates a conventional RF front-end circuit with a directional coupler and a mixer.

FIG. 1 illustrates a known RF circuit for transmitting and receiving RF signals (RF front-end 1) comprising a directional coupler 10 and a mixer 11. The directional coupler 10 is, for example, a rat race coupler having four inputs/outputs which are usually called ports (A, B, C, D). In the following, a first port of the directional coupler 10 is referred to as "first oscillator port" A. An oscillator signal OSZ is provided to the first oscillator port A, the oscillator signal OSZ being generated, for example, by a local RF oscillator and being amplified by an RF amplifier 2. The second port of the directional coupler 10 is referred to as "second oscillator port" B. This port is connected with the oscillator input of the mixer 11. The third port of the directional coupler 10 is referred to as "second RF port" C, which is connected to a signal input of the mixer 11. The fourth port of the directional coupler is referred to as "first RF port" D, which can be connected to an antenna 3.

The oscillator signal OSZ supplied to the first oscillator port A of the directional coupler 10 is, on the one hand, to be transmitted by the antenna 3 as a transmit signal TX, and, on the other hand, is used as a mixer signal $OSZ_{MIX}$ for mixing the signals received from the antenna 3 into the baseband or the IF-band. For this purpose the directional coupler is designed such that a signal incident at the first oscillator port A is coupled to the second oscillator port B as well as to the first RF port D. The second RF port C should be isolated against a signal incident at the first oscillator port A. In the figures the coupled ports are labeled with arrows having a solid line. The direction of the arrows indicates the direction of the signal flow.

During operation of the RF front-end, an antenna signal RX received by the antenna 3 is incident at the first RF port D of the directional coupler 10 and is coupled to the second RF port C as a receive-signal RF and to the first oscillator-port A. The receive-signal RF is thus supplied to the signal input of the mixer 11, and down-mixed to the IF-band (or baseband) with the help of the mixer signal $OSZ_{MIX}$. The resulting IF-signal (or baseband signal) IF is provided at an output of the mixer 11 for further processing. A part of the antenna signal RX is typically coupled back to the first oscillator port A. This part of the antenna signal RX should be terminated by an adequate terminating impedance for avoiding undesired reflections. This terminating impedance may be, for example, arranged at the output of the RF power amplifier.

A real directional coupler does not have ideal properties in terms of through-loss and isolation of its ports. The oscillator signal OSZ incident at the first oscillator port A, for example, is not only, as desired, coupled to the second oscillator port B and to the first RF port D, but a small part of the signal is also coupled to the second RF port C due to parasitic effects. This small part of the oscillator-signal OSZ which is undesirably coupled to the second RF port C is labeled by the reference symbol $OSZ_{THRU}$ and indicated by an arrow having a dash-dotted line. The parasitic signal $OSZ_{THRU}$ superimposes at the signal input of the mixer 11 the receive-signal RF which stems from the antenna 3. A DC signal-offset at the mixer output is caused by the undesired, parasitic signal $OSZ_{THRU}$ when mixed with the mixer signal $OSZ_{MIX}$, the DC signal offset superimposing the resulting IF-signal. The greater this DC signal-offset, the higher the power of the oscillator signal OSZ to be transmitted.

The DC signal offset leads to problems especially when using active mixers, since it limits the transmittable power. In radar applications a limitation of the transmittable power is equal to a limitation of the field of view of the radar sensor.

Figure 2:
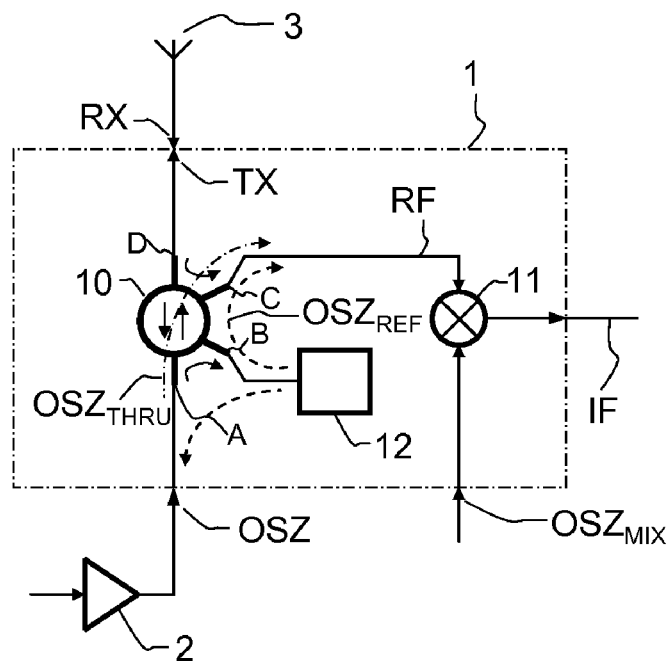
FIG. 2 illustrates an RF front-end circuit comprising a directional coupler, a mixer, and a reflection circuit connected to the mixer according to one example of the invention.

FIG. 2 illustrates, as a first example of the invention an RF front-end circuit 1 with a mixer 11, a directional coupler 10 and a reflection circuit 12 which is connected to the directional coupler 10. An oscillator signal OSZ which is to be transmitted is supplied to the first oscillator port A of the directional coupler 10. The directional coupler 10 couples this signal as transmit-signal TX to the first RF port D, where it can reach the antenna 3, and to the second oscillator port B which is, in the present example, connected to the input of a reflection circuit 12. The signal part of the oscillator signal OSZ which is coupled to the second oscillator port B by the directional coupler 10 is thus supplied to the input of the reflection circuit 12.

The second RF port C is, as illustrated in FIG. 1, connected with the signal input of the mixer 11. An antenna signal RX incident at the first RF port D is coupled to the second RF port C as receive signal RF and is thus supplied to the signal input of the mixer 11. In the present example the mixer signal $OSZ_{MIX}$ supplied to the oscillator input of the mixer 11 is an external signal supplied to the RF front-end circuit. The mixer signal $OSZ_{MIX}$ is, for example, derived from the oscillator signal OSZ by means of an external power divider (not shown).

The input of the reflection circuit comprises a complex input impedance whose value is chosen such that a part $OSZ_{REF}$ of the oscillator signal is reflected. The phase and the absolute value of the reflected part $OSZ_{REF}$ of the oscillator signal depend on the input impedance of the reflection circuit 12. This reflected part $OSZ_{REF}$ of the oscillator signal is incident at the second oscillator port B of the directional coupler 10 and thus coupled to the second RF port C (illustrated by the arrow with the dashed line), such that it destructively superposes the parasitic oscillator signal $OSZ_{THRU}$ coupled directly from the oscillator port A to the second RF port C. An optimally adjusted complex input impedance of the reflection circuit 12 allows for complete elimination of the parasitic oscillator signal $OSZ_{THRU}$ at the signal input of the mixer 11 which is connected to the second RF port C, thus eliminating the undesired DC offset at the output of the mixer 11.

Figure 3:
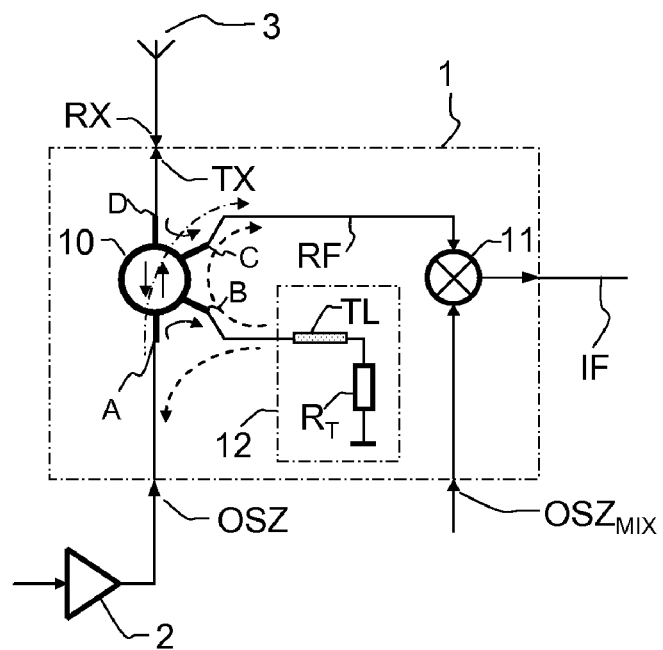
FIG. 3 illustrates the RF front-end circuit of FIG. 2 comprising a reflection circuit with a delay line and an ohmic resistance.

One example of the reflection circuit 12 is depicted in FIG. 3. In this example the reflection circuit 12 comprises a delay line TL and an ohmic resistance $R_T$ being connected with the delay line TL. The delay line TL and the resistance $R_T$ may be, for example, connected in series between the second oscillator port B of the directional coupler 10 and a reference potential (e.g., ground). The input impedance of the reflection circuit 12 illustrated in FIG. 3 is determined by the delay time of the delay line TL and by the value of the resistance $R_T$, wherein the resistance $R_T$ essentially determines the real part of the input impedance and therefore the absolute value of the reflected part $OSZ_{REF}$ of the oscillator signal, whereas the delay line TL determines the phase of the reflected part $OSZ_{REF}$ of the oscillator signal.

Figure 4:
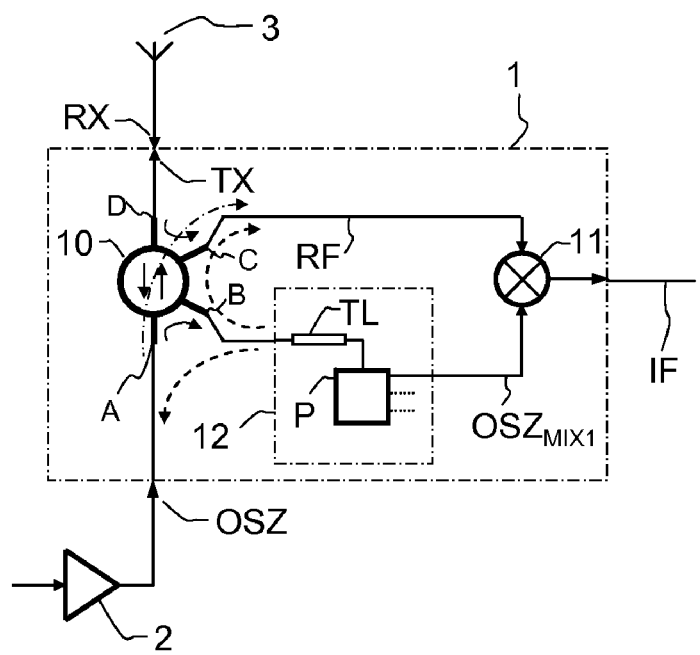
FIG. 4 illustrates the RF front-end circuit of FIG. 2 with an alternative reflection circuit comprising a delay line and a power divider.

FIG. 4 illustrates a modified version of the RF front-end circuit 1 of FIG. 3, where the resistance $R_T$ of the reflection circuit 12 is formed by the input impedance of a power divider P. Analogous to the example of FIG. 3, a part of the signal incident at the input of the reflection circuit 12 is reflected and coupled to the second RF port C such that the reflected part $OSZ_{REF}$ of the signal is destructively superimposed at the signal input of the mixer 11 with the parasitic oscillator signal $OSZ_{THRU}$ which is coupled from the first oscillator port A to the second RF port C. Compared to the example of FIG. 3 the power divider P allows for using the oscillator signal $OSZ_{MIX}$, which is coupled to the second oscillator-port B of the directional coupler 10, as mixer signal for the oscillator input of the mixer 11. In the present example the output signal $OSZ_{MIX1}$ of the power divider P is supplied to the oscillator input of the mixer 11. Such a configuration has the advantage that—in contrast to the example of FIG. 3—the mixer signal $OSZ_{MIX1}$ is not supplied from outside of the RF front-end circuit 1.

Figure 5:
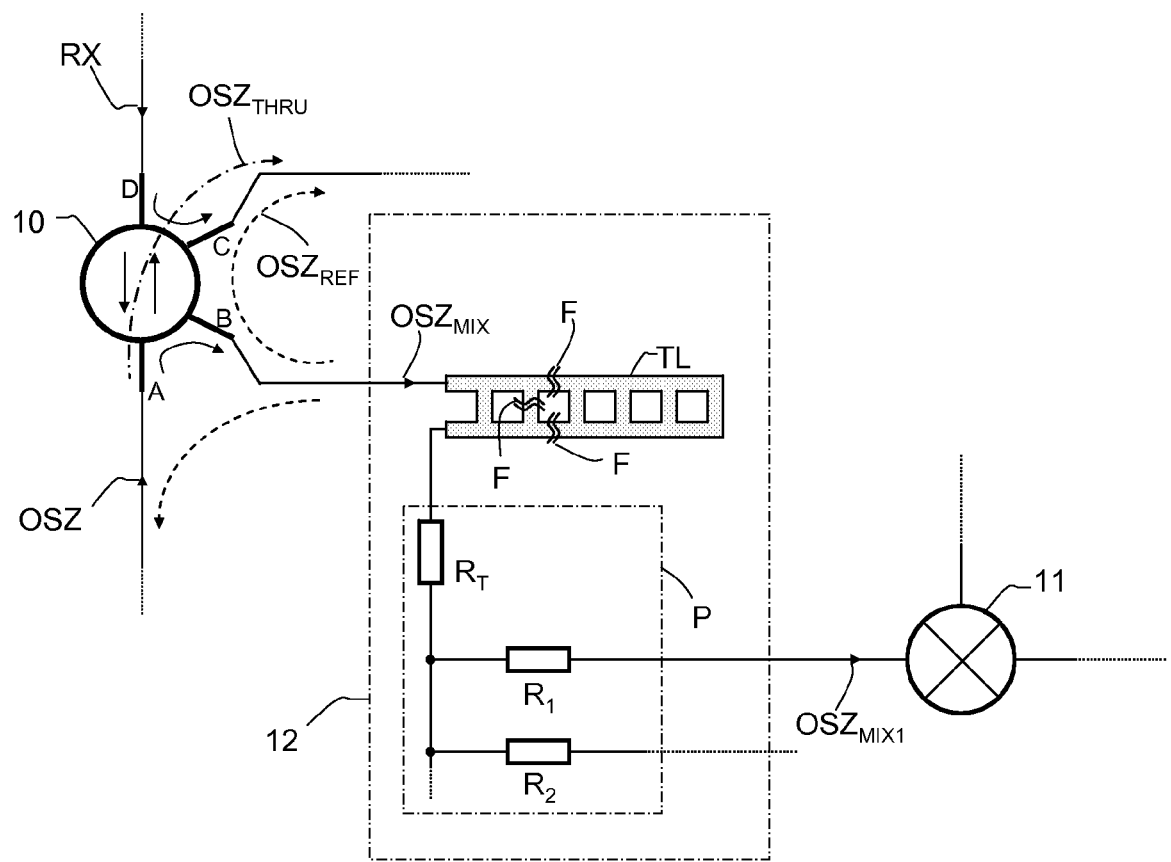
FIG. 5 illustrates in a magnified illustration another, more detailed example of the reflection circuit according to FIG. 2.

An exemplary realization of the delay line TL and the power divider P of the reflection circuit 12 is illustrated in more detail in FIG. 5. The oscillator signal OSZ incident at the first oscillator port A of the directional coupler 10 is coupled to the second oscillator port B by the directional coupler 10 and therefore to the input of the reflection circuit 12. This input signal of the reflection circuit 12 is denoted with $OSZ_{MIX}$ in this example. An output of the power divider P provides a mixer signal $OSZ_{MIX1}$ derived from the input signal $OSZ_{MIX}$. The mixer signal $OSZ_{MIX1}$ may be supplied to the oscillator input of the mixer 11 as shown in the example of FIG. 4.

The delay line TL illustrated in FIG. 5 comprises at least two parallel microstrip lines which are connected by short-circuits at several positions thus forming a "ladder-shaped" structure, where the short-circuits are the "rungs" of the ladder-shaped structure. The two parallel microstrip lines may be separable at positions between the short-circuits as well as the short-circuits themselves. The "separation" of the microstrip lines may be performed by melting the lines with a laser beam such that they are disjoined. The separate positions of the microstrip lines and of the short-circuits are then usually referred to as "laser-fuses" F. As it can be seen from FIG. 5 the length of the delay line TL depends on which laser-fuses are disjoined. Dependent on the length of the microstrip lines and on the number of short-circuits between the microstrip lines, a plurality of possible lengths for the delay line TL exist. The necessary phase for the reflected signal $OSZ_{REF}$, and therefore the necessary length of the delay line TL, can be determined empirically and the length of the delay line TL can be adjusted by disjoining certain laser-fuses. The power divider which is connected to the delay line TL may be implemented as a passive electronic component in the present example having a first resistor $R_T$ and one or more further resistors $R_1$, $R_2$. A first terminal of the first resistor $R_T$ is connected to the delay line TL. The first resistor usually determines the real part of the input impedance of the reflection-circuit 12 and therefore the absolute value of the reflected signal $OSZ_{REF}$. For adjusting the exact value of the first resistor $R_T$, the resistor can be tuned by means of a laser beam during the production process. A second terminal of the first resistor $R_T$ is connected with the further resistors $R_1$, $R_2$ which are connected between the first resistor $R_T$ and one of the outputs of the power divider respectively. The ratio of the further resistors $R_1$, $R_2$ essentially determine the power ratio of the power divider P.

Analogous to the delay line TL the directional coupler 10 may be realized by microstrip lines. In this case the entire RF front-end may be integrated in a single chip, if applicable, together with further RF components like the antenna 3. Such chip design allows for the production of compact and cost effective radar systems, especially for the use in automobiles.

In the example explained with reference to FIG. 5, the absolute value and the phase of the input impedance of the reflection circuit 12 is adjusted by means of the delay line TL and the ohmic resistance $R_T$. By adjusting the delay time of the delay line TL and the value of the resistor $R_T$ separately, the absolute value and the phase of the input impedance and thus the absolute value and the phase of the reflected signal can be adjusted separately. This is to be understood as an example wherein it is also possible to adjust the real part and the imaginary part of the input impedance separately in other implementations which, for example, may comprise a parallel circuit of a capacitance (e.g., a varactor) and a (e.g., electronically adjustable) resistor. Generally the input impedance may be a more complex network comprising resistive and capacitive components of which at least some are electronically adjustable.

An electronically adjustable resistor could, for example, be implemented by means of a pin-diode (P-intrinsic-N diode) or by means of the corrector-emitter-path of a bipolar transistor for the drain-source-path of a field effect resistor, respectively. However, the actual implementation still depends on the manufacturing process.

Electronically variable components for electronically adjusting the terminal impedance at the second oscillator port B can be an alternative to laser-separable components. The adjusting of the phase which may be done by adjusting the length of a delay line in the example of FIG. 5, can also be realized by an electronically variable delay line comprising, for example, a varactor. This provides the advantage, that the input impedance of the reflection-circuit 12 can not only be adjusted once during the manufacturing process, but also during operation of the RF front-end. This is especially useful for compensating drifts of electrical properties of the directional coupler or the reflection circuit.

Figure 6:
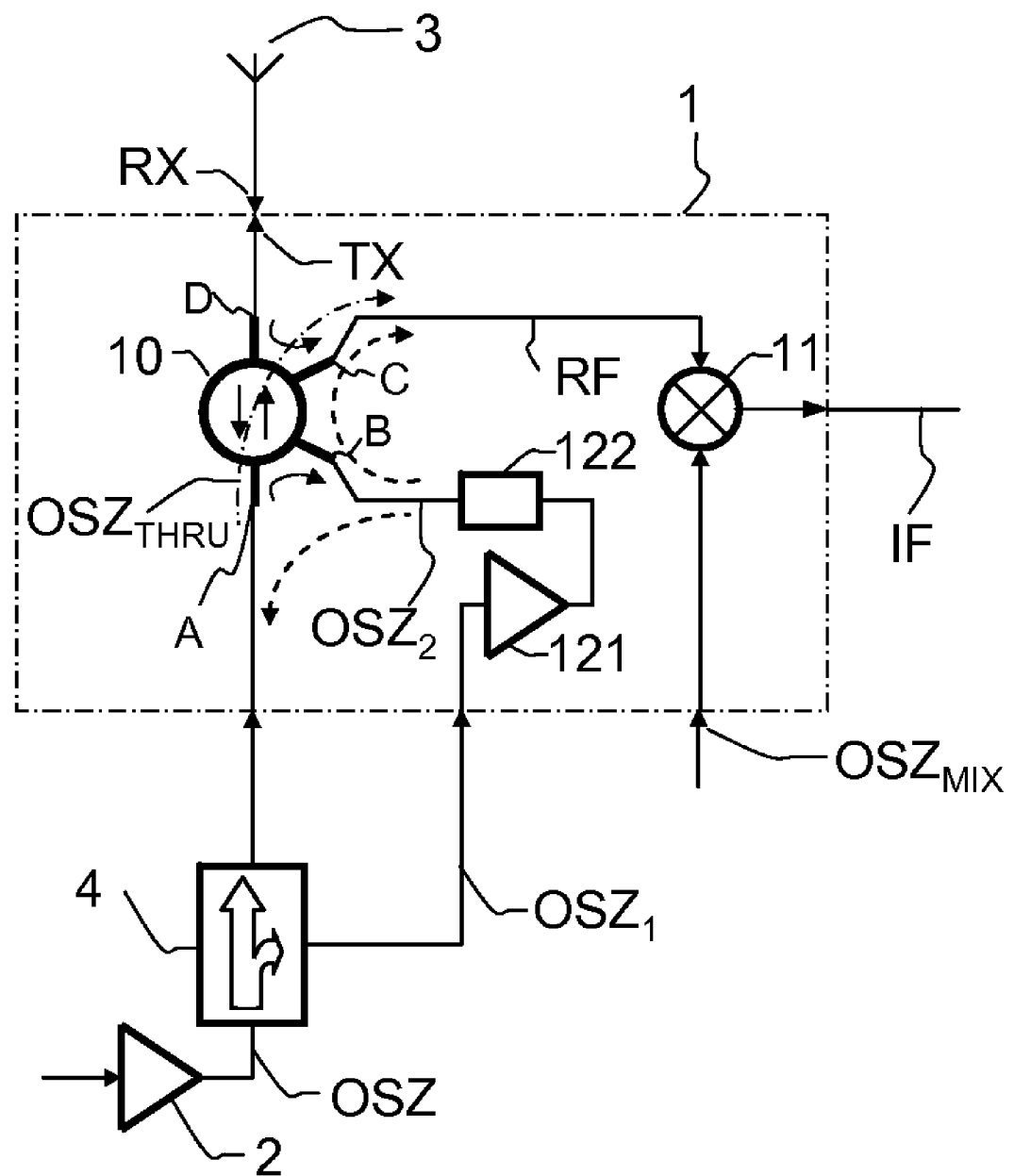
FIG. 6 illustrates a further exemplary embodiment of an RF front-end circuit.

FIG. 6 shows a further exemplary embodiment of the RF front-end circuit. The RF front-end circuit 1 of FIG. 6 differs from the example of FIG. 3 in that an amplifier 121 and a phase shifter 122 are connected to the second oscillator port B. In contrast to the previous examples, the oscillator signal OSZ coupled from the first oscillator port A to the second oscillator port B is not reflected, but a compensation signal $OSZ_2$, which is amplified and phase-shifted with respect to the oscillator signal OSZ, is supplied to the second oscillator port B such that this compensation signal $OSZ_2$ is at least partially coupled to the second RF port C by the directional coupler 10, where it destructively superposes the parasitic signal $OSZ_{THRU}$, which is directly coupled from first oscillator port A to the second RF port C. Thus the same effect, namely the (at least partial) elimination of the parasitic signal $OSZ_{THRU}$ directly coupled from the first oscillator port A to the second RF port C, is achieved as it is explained with respect to the above-described examples comprising a reflection-circuit 12.

A part $OSZ_1$ of the oscillator signal OSZ which may be derived, for example, from the oscillator signal OSZ by means of another power divider 4 is supplied to the amplifier 121. The output of the amplifier is connected to the second oscillator port B via the phase-shifter 122. The gain of the amplifier 121 and the phase-shift of the phase-shifter 122 are adjusted such that, the part of the compensation signal $OSZ_2$ of the phase-shifter which is coupled from the second oscillator port B to the second RF port C compensates for the parasitic signal $OSZ_{THRU}$ by a destructive superposition. The part of the output signal of the phase-shifter 122 which is coupled back to the first oscillator port A has to be terminated at an adequate position for avoiding undesirable reflection. The position of the amplifier 121 and the phase-shifter 122 may of course be interchanged.

The amplifier 121 may be a variable gain amplifier. The phase-shift of the phase-shifter 122 may be also adjustable. Therefore the phase-shifter may, for example, comprise varactors. If the gain of the amplifier 121 and the phase-shifter, the phase-shifter 122 are electronically adjustable, it is possible to adjust the RF front-end during operation such that no DC-offset occurs at the output of mixer 11 or at least such that the offset is kept as small as possible.

Alternatively, the absolute value and the phase of the compensation signal $OSZ_2$ fed into the second oscillator port B can also be adjusted by means of a quadrature mixer. In this case the quadrature mixer takes over the function of the series circuit of amplifier 121 and phase-shifter 122 of FIG. 6.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted.

What is claimed is:

1. An RF front-end circuit comprising:
   a directional coupler adapted to receive an antenna signal and an oscillator signal;
   a mixer coupled to the directional coupler to receive the antenna signal, the mixer further adapted to receive a mixer signal and to generate an output signal related to the antenna signal and the mixer signal; and
   a reflection circuit coupled to the directional coupler to receive the oscillator signal, the reflection circuit adapted to reflect at least a portion of the oscillator signal to the mixer via the directional coupler to counteract a parasitic portion of the oscillator signal received at the mixer.

2. The circuit of claim 1, wherein the reflection circuit comprises a complex input impedance.

3. The circuit of claim 1, wherein the reflection circuit comprises a delay line and a resistance.

4. The circuit of claim 1, wherein the reflection circuit comprises a delay line and a power divider, an input impedance of the power divider comprising a resistance.

5. The circuit of claim 4, wherein the power divider is adapted to provide the mixer signal.

6. The circuit of claim 1, wherein the reflection circuit comprises a delay line comprising at least two parallel strip lines coupled by a plurality of short-circuits.

7. The circuit of claim 6, wherein the short-circuits are destructible.

8. The circuit of claim 7, wherein the short-circuits are laser-destructible.

9. The circuit of claim 6, wherein the strip lines are separable at locations between adjacent short-circuits.

10. The circuit of claim 9, wherein the strip lines are laser-separable.

11. The circuit of claim 1, wherein the output signal is one of a baseband signal and an intermediate frequency (IF) signal.

12. The circuit of claim 1, wherein the reflection circuit is adapted to reduce a DC signal offset in the output signal by counteracting the parasitic portion of the oscillator signal received at the mixer.

13. An RF front-end circuit comprising:
   a mixer comprising:
      a first input adapted to receive an antenna signal;
      a second input adapted to receive a mixer signal; and
      an output adapted to provide an intermediate frequency signal;
   a directional coupler comprising:
      a first RF port adapted to be coupled to an antenna;
      a second RF port coupled to the first input of the mixer and adapted to receive the antenna signal;
      a first oscillator port adapted to receive an oscillator signal;
      a second oscillator port coupled to the first oscillator port and adapted to receive the oscillator signal; and
   a reflection circuit comprising an input coupled to the second oscillator port, the reflection circuit comprising a complex input impedance having a value such that a portion of the oscillator signal is reflected at the reflection circuit input to the second oscillator port of the directional coupler to superimpose with a parasitic portion of the oscillator signal between the first oscillator port and the second RF port and reduce a DC offset signal at the output of the mixer.

14. The circuit of claim 13, wherein the reflection circuit comprises a delay line and an ohmic resistance.

15. The circuit of claim 13, wherein the reflection circuit comprises a delay line and a power divider.

16. The circuit of claim 15, wherein the power divider is coupled to the mixer and is adapted to provide the mixer signal.

17. The circuit of claim 13, wherein the reflection circuit comprises a delay line comprising at least two parallel strip lines coupled by a plurality of short-circuits.

18. The circuit of claim 17, wherein the short-circuits are separable.

19. The circuit of claim 18, wherein the short-circuits are laser-separable.

20. The circuit of claim 17, wherein the strip lines are separable at locations between adjacent short-circuits.

21. The circuit of claim 20, wherein the strip lines are laser-separable.

22. The circuit of claim 13, wherein the reflection circuit comprises electronically adjustable components adapted to selectively adjust an input impedance of the reflection circuit to compensate for the parasitic portion of the oscillator signal.

23. A radar system comprising:
   RF front-end circuitry comprising:
      a directional coupler adapted to receive an antenna signal and an oscillator signal;
      a mixer coupled to the directional coupler to receive the antenna signal, the mixer further adapted to receive a mixer signal and to output a baseband signal related to the antenna signal and the mixer signal;
      a reflection circuit coupled to the directional coupler to receive the oscillator signal, the reflection circuit adapted to reflect at least a portion of the oscillator signal to the mixer via the directional coupler to counteract a parasitic portion of the oscillator signal received at the mixer and reduce a DC signal offset at an output of the mixer; and
   an antenna integrated with the RF front-end circuitry on a single chip.

24. The radar system of claim 23, wherein the directional coupler comprises a plurality of microstrip lines.

* * * * *